UNITED STATES PATENT OFFICE.

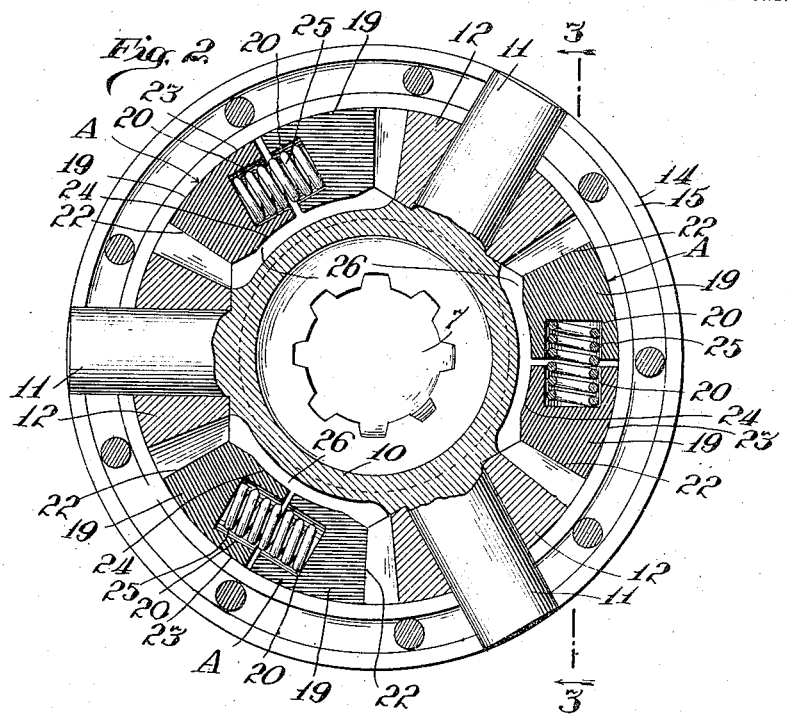
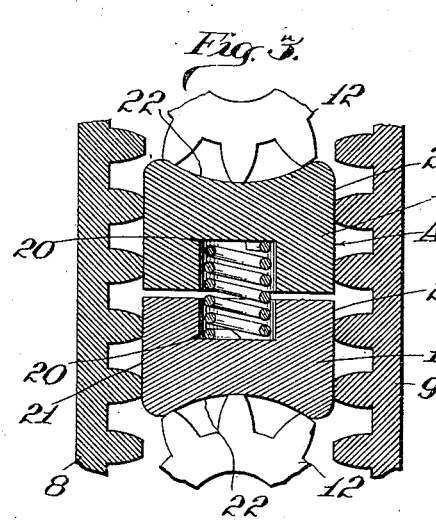
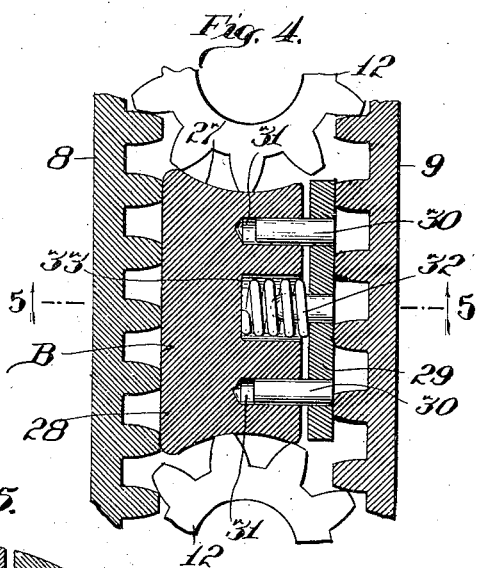
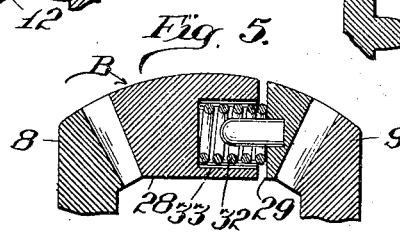

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

BRAKE DEVICE FOR DIFFERENTIALS.

1,324,858.     Specification of Letters Patent.     Patented Dec. 16, 1919.

Original application filed May 6, 1918, Serial No. 232,694. Divided and this application filed December 28, 1918. Serial No. 268,747.

*To all whom it may concern:*

Be it known that I, CLARENCE W. TAYLOR, a citizen of the United States of America, residing at Chicago, in the county of Cook and State of Illinois, have invented certain new and useful Improvements in Brake Devices for Differentials, of which the following is a specification.

My invention relates to improvements in brake devices for differentials, more particularly to that type of differential in which is employed draft members fixed to the adjacent ends of a divided shaft and having a transmission gear train comprising members which are connected with the draft members and disposed in a circular series about the axis of the fixed shafts, and is a division of my pending application, Serial #232,694, filed May 6, 1918.

An object of the invention is to provide devices incorporated with a differential in an automobile, truck, or the like, whereby to give a solid axle effect in operation and yet permit ample compensation for the difference in travel of either road wheel, when deviating from a straight ahead path.

Another object of the invention is to produce a construction which in operation will prevent what is termed "spinning" of either of the road wheels in an automobile regardless of the surface conditions of the road.

Other objects of the invention are the provision of a two-part brake device and a resilient member reacting between the two parts and thrusting them apart and against the parts with which they respectively make frictional encounter.

A practical embodiment of the invention is illustrated in the accompanying drawings which are a part hereof and in which similar characters of reference indicate the corresponding parts in all the views.

The invention consists in the novel features and parts and in the novel combination and arrangement of the same, which will be more fully described hereinafter and then pointed out in the claims hereunto appended.

In the drawings—

Fig. 2 is a cross sectional view on line 2—2 on Fig. 1.

Fig. 3 is a section on line 3—3 on Fig. 2.

Fig. 4 is a sectional detail of the draft gears and two planetary pinions with a modified form of the two part brake device.

Fig. 5 is a cross section on line 5—5 on Fig. 4.

Figure 1:
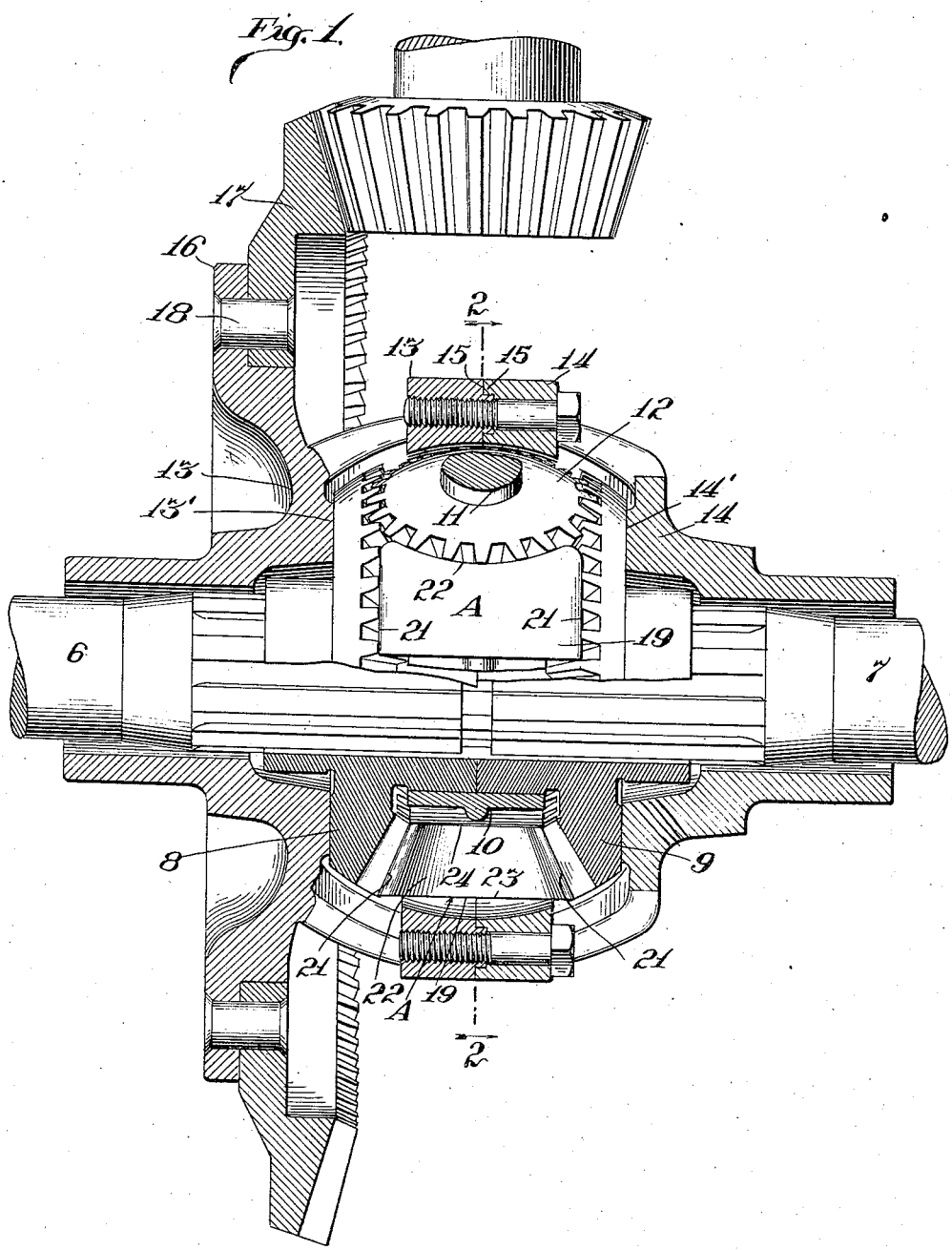
Figure 1 is a horizontal section of the mid portion of the rear axle of an automobile at the adjacent ends of the divided shaft including a brake device incorporated therewith, partly in elevation.

Referring to the drawings, the adjacent ends 6, 7, of the usual divided shaft are fixed in the common manner in the draft gears 8, 9, between which power is transmitted. The spider 10, is termed a driver or power imparting member and is formed with trunnions 11 on which are loosely mounted planetary pinions 12, comprising a series of power transmitting members disposed in a circle about the axis of the divided shaft and being in mesh with both of the draft gears 8, 9. The rotatable housing comprises a left portion 13, and a right portion 14, which are recessed in their meeting edges at 15 to receive and carry the end portions of the trunnions 11, for power transmission from the rotatable housing and the spider to the draft gears 8, 9. The portion 13 of the rotatable housing is formed with an external annular flange 16, has secured thereto a ring gear 17, by rivets 18, the ring gear being in mesh with a pinion driven from a source of power (not shown), all in the well known form and manner, particularly when bevel gear type of differential is employed. It should be understood I do not intend to limit my invention to the use of any type of differential mechanism.

The part 13 of the rotatable housing and the contiguous face 13' of the gear 8 have a "running fit". So also the part 14 of the rotatable housing and the contiguous face 14' of the gear 9 have a running fit.

For the purpose among other things of producing a construction readily usable with differentials of the principal makers without necessity for change in present designs and to afford simple means which may be positioned in space not otherwise occupied in differentials, such means being capable of sufficiently opposing relative rotative movement of the gears on the divided shaft in motor vehicles to cause substantially a solid rear axle action and yet permit ample differentiation of the road wheels, I have constructed and incorporated with differential mechanism what is termed for the purposes herein a brake device A comprising a pair of brake shoes 19, alike in construction, a description of one shoe sufficing for a description of both shoes. Each shoe is recessed at 20, both sides 21, being tapered inwardly, the recessed ends being parallel to each other, the ends 22, are arcuate, frusto-conical and tapered inwardly to conform to the outline of the planetary pinions 12, the surface 23 is convex and the face 24 preferably is concave. The spring 25 reacts between the two shoes and thrusts them apart and against the planetary pinions or the opposing draft gears with which the shoes respectively make frictional encounter. The brake devices are interposed in each interval 26 between the members of said series of power transmitting members whereby the brake devices alternate in said circle with said transmission members for reacting yieldingly simultaneously frictionally against two members of the connecting train which have movement relatively to each other when the two shaft members have relative rotation.

In the modified form of the brake device B, shown in Figs. 4 and 5, the ends 27, are arcuate, frusto-conical and tapered inwardly to conform to the shape of the frusto-conical planetary pinions 12. The sides 28, 29, of the brake device B, are adapted to be forced apart and into frictional relation with portions of the draft gears 8, 9. Preferably the pins 30 are positioned for movement in recesses 31. The compression spring 32, is disposed in the larger recess 33, and constantly urges both parts of the brake device B apart into frictional relation with the gears 8, 9.

A single brake device may be used for light work but in cases of heavy duty, for example in trucks or heavy touring cars more than one brake device should be employed.

The shoes 19 of brake device A and the parts of the modification B, may be made of case hardened steel, and the members of the power transmitting train may be similarly heat treated, and the several parts sufficiently lubricated in operation.

The transmission train comprises the pair of draft gears 8, 9, and the circular series of pinions 12 interposed between them.

In operation, a pair of friction-shoes are interposed between two members of the transmission train with the resilient member under tension therebetween, the degree of pressure of the resilient member depending a good deal upon how much frictional resistance is required, how many brake devices are employed and the area of the friction surfaces.

Obviously the chief functions of the brake devices is to oppose relative movement of the rotative parts with which the brake devices make frictional encounter.

By thus showing and specifically describing the embodiment herein of my invention, I do not intend to restrict the range of equivalents not made necessary by the prior state of this art.

Having thus fully described my invention, what I claim as new, and desire to secure by Letters Patent, is—

1. The combination with a differential having a divided shaft, draft gears between which power is transmitted and power-transmitting train members by which said draft gears are connected, of a two-part brake device positioned between the power transmission members, and a resilient member positioned and reacting between the two parts and thrusting them apart and against the elements with which they respectively make frictional encounter.

2. The combination with a differential having a divided shaft and draft gears fixed to the adjacent ends of said shaft, and a circular series of power transmitting train members by which said draft gears are connected, of a plurality of brake devices each comprising two brake shoes interposed in an interval between two members of said circular series of power transmission members whereby the brake devices alternate in the circle with said transmission members and a resilient member positioned and reacting between each two brake shoes and thrusting them apart and against the elements with which they respectively make frictional encounter.

3. The combination with a differential having a divided shaft and draft gears fixed to the adjacent ends of said shaft, power transmitting train members by which said draft gears are operatively connected and a rotatable housing, of a plurality of brake devices interposed in an interval between two members of said circular series of power transmitting members each comprising two brake shoes and a resilient member therebetween, said resilient members reacting between said brake shoes and thrusting them apart and against the elements with which they respectively make frictional contact.

4. The combination with a differential having a divided shaft and draft gears fixed to the adjacent ends of said shaft, and a circular series of power transmitting train members by which said draft gears are connected and including a spider and a rotatable housing, of a plurality of brake devices interposed in an interval between two members of said circular series of power transmitting members each comprising two brake shoes and a resilient member therebetween, said resilient members reacting between said brake shoes and thrusting them apart and against the two elements with which they respectively make frictional encounter.

5. The combination with a differential having a divided shaft and draft gears fixed to the adjacent ends of said shaft, and power transmitting train members by which said draft gears are connected and including a spider and a rotatable housing, of a plurality of brake devices each comprising two friction shoes and a resilient member positioned and reacting between each two brake shoes and thrusting them apart and against said draft gears.

In testimony whereof I affix my signature.

CLARENCE W. TAYLOR.